(12) United States Patent
Hahn

(10) Patent No.: US 7,041,707 B2
(45) Date of Patent: May 9, 2006

(54) POLYETHER POLYESTERS HAVING ANIONIC FUNCTIONALITY

(75) Inventor: Carl W. Hahn, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 89 days.

(21) Appl. No.: 10/350,462

(22) Filed: Jan. 24, 2003

(65) Prior Publication Data

US 2004/0147407 A1    Jul. 29, 2004

(51) Int. Cl.
   *B01D 17/05*    (2006.01)
   *E21B 43/00*    (2006.01)
   *C09K 8/60*     (2006.01)

(52) U.S. Cl. ........................ 516/158; 525/437; 528/301; 507/117; 507/219

(58) Field of Classification Search ................ 516/154, 516/155, 158, 160; 525/437; 528/301; 507/117, 507/219
See application file for complete search history.

(56) References Cited

U.S. PATENT DOCUMENTS

| 2,255,316 | A |   | 9/1941  | Harris ........................ 516/154 |
| 2,321,056 | A |   | 6/1943  | Wayne ........................ 516/150 |
| 2,328,062 | A |   | 8/1943  | De Groote et al. ......... 554/167 |
| 2,329,394 | A |   | 9/1943  | De Groote et al. ......... 554/122 |
| 2,679,520 | A | * | 5/1954  | De Groote ................... 516/187 |
| 2,950,299 | A | * | 8/1960  | Kirkpatrick ................. 516/187 |
| 3,057,890 | A |   | 10/1962 | De Groote et al. ......... 516/127 |
| 3,110,682 | A |   | 11/1963 | De Groote et al. ......... 516/187 |
| 3,424,565 | A | * | 1/1969  | Garrett ....................... 516/189 |
| 3,684,735 | A |   | 8/1972  | Oppenlaender et al. ..... 516/165 |
| 4,702,857 | A | * | 10/1987 | Gosselink ................... 510/299 |
| 5,571,620 | A | * | 11/1996 | George et al. ............... 428/375 |
| 5,725,647 | A | * | 3/1998  | Carlson et al. ........... 106/31.86 |
| 6,022,403 | A | * | 2/2000  | Kuo ........................... 106/31.86 |

* cited by examiner

*Primary Examiner*—Daniel S. Metzmaier
(74) *Attorney, Agent, or Firm*—Michael B. Martin; Thomas M. Breininger

(57) ABSTRACT

Polyester compositions and methods of producing and using same are provided. The polyester compositions at least include an anionic diacid monomer or diester monomer thereof and a polyether. The polyester compositions of the present invention can be effectively utilized, for example, to treat crude oil during production and refinery processing.

17 Claims, No Drawings

POLYETHER POLYESTERS HAVING ANIONIC FUNCTIONALITY

BACKGROUND OF THE INVENTION

The present invention relates generally to polyester compositions. More specifically, the present invention relates to polyether polyesters with an anionic functionality and methods of producing and using same.

In the production of oil from oil wells, the produced fluids frequently include water in the form of free water or emulsion. In general, it is necessary to reduce the water content in order to obtain pipeline quality oil. For example, a water content of less than 1.0% in the produced fluids is typically required.

A variety of mechanical, electrical, and chemical processes are known and used to dehydrate oil well produced fluids and/or refined or processed portions thereof. With respect to chemical applications, demulsifiers can be employed. In general, a demulsifier is considered a single or a blend of surfactant compounds in a suitable solvent system which is formulated to treat a particular emulsion on an optimum cost/performance basis.

The demulsifier acts to separate oil and water, and thus the produced fluid can be more readily dehydrated to specified levels. This makes the oil well produced fluid better suited for transportation via a pipeline as previously discussed. Further, salt content can be lowered in oil refining by a renewed formation of an emulsion with fresh water and demulsification before distillation. In this regard, a salt content in crude oil that is too high can be problematic. For example, this can cause problematic levels of corrosion during refining.

A variety of demulsifiers are known. Typically, demulsifiers are, in general, derived from alcohols, fatty acids, fatty amines, glycols and alkylphenol formaldehyde condensation products.

A need, therefore, exists to provide improved compositions that are capable of treating crude oil to facilitate the production and refinery processing of same, such as breaking emulsions within the crude oil in order to facilitate dehydration thereof.

SUMMARY OF THE INVENTION

The present invention relates generally to polyester compositions. In particular, the present invention relates to polyesters that are composed of polyethers and an anionic functionality. The compositions of the present invention can be effectively utilized in a number of different applications, particularly as applied to crude oil processes.

In general, the polyester compositions of the present invention at least include a polyether and an anionic diacid monomer. In this regard, the compositions of the present invention are, in general, water soluble or water dispersible. This makes the compositions particularly suited as demulsifiers, viscosity reducers and/or emulsion modifiers during crude oil production and/or refinery processes.

The polyether and anionic diacid monomer can include a number of suitable and different materials. In an embodiment, the polyether includes poly(tetrahydrofuran), poly(ethylene glycol), poly(propylene glycol), poly(butylene glycol), copolymers thereof including block copolymers thereof, the like and combinations thereof. The anionic diacid monomer and diester monomers thereof can include, for example, dimethyl 5-sulfoisophthalate, sulfosuccinic acid, 4-sulfophthalic acid, sulfonaphthalic acid, the like, salts thereof including alkali salts, anhydrides thereof and combinations thereof.

In an embodiment, the present invention provides an oil-treatment agent. The oil-treatment agent includes a polyester compound composed of a polyether and an anionic diacid monomer.

In another embodiment, the present invention provides a method of producing a polyester composition capable of treating oil. The method includes processing a number of ingredients including a polyether and an anionic diacid monomer, thereby forming the polyester composition.

In yet another embodiment, the present invention provides a method of treating oil. The method includes providing a treatment agent that includes a polyester composed of a polyether and an anionic diacid monomer; and adding an effective amount of the treatment agent to oil.

An advantage of the present invention is to provide improved polyester compositions.

Another advantage of the present invention is to provide methods of producing and using improved polyester compositions.

Yet another advantage of the present invention is to provide improved polyester polyethers having an anionic functionality that can be effectively employed to treat oil.

Yet still another advantage of the present invention is to provide improved polymeric compositions that can be effectively utilized to dehydrate crude oil during production and refinery processing.

Additional features and advantages of the present invention are described in, and will be apparent from, the following Detailed Description of the Invention.

DETAILED DESCRIPTION OF THE INVENTION

The present invention relates generally to polymeric compositions. More particularly, the present invention relates to polyester compositions that have an anionic functionality. It should be appreciated that the compositions of the present invention can be effectively utilized in a number of different applications, particularly as applied to crude oil processes.

In an embodiment, the polyester compositions of the present invention at least include a polyether and an anionic diacid monomer. In general, the compositions are water soluble or water dispersible. This makes the compositions particularly well-suited as demulsifiers, viscosity reducers and/or emulsion modifiers during crude oil production and/or refinery processes.

The polyester composition of this invention is effective for resolving a broad range of hydrocarbon emulsions encountered in crude oil production, refining and chemical processing. Typical hydrocarbons include crude oil, refined oil, bitumen, condensate, slop oil, distillates, fuels and mixtures thereof. The polyester composition is also useful for resolving emulsions in butadiene, styrene, acrylic acid, and other hydrocarbon monomer process streams.

The polyester composition of this invention is particularly effective on a varying slate of crude oil types. For example, the polyester composition is effective at rapid, substantial demulsification of oil and production of dry residual oil. Further, it is believed that the polyester composition of the present invention can afford an increased biodegradation relative to existing demulsifiers and the like. The water-soluble nature of the present invention allows the use of water as a solvent and carrier fluid. This can provide a significant cost savings and environmental benefits by reducing organic solvent use.

The polyether and anionic diacid monomer can include a number of suitable and different materials. In an embodiment, the polyether includes poly(tetrahydrofuran), poly(ethylene glycol), poly(propylene glycol), poly(butylene glycol), copolymers thereof including block copolymers thereof, such as, poly(ethylene glycol)-block-poly(propylene glycol)-block-poly(ethylene glycol), poly(propylene glycol)-block-poly(ethylene glycol)-block-poly(propylene glycol), poly(ethylene glycol)-block-poly(tetrahydrofuran)-block-poly(ethylene glycol), poly(propylene glycol)-block-poly(tetrahydrofuran)-block-poly(propylene glycol), and poly(ethylene-ran-propylene glycol), the like and combinations thereof.

The anionic diacid monomer comprises an aryl group such as phenyl, naphthyl, and the like substituted with two carboxylate groups and at least one additional anionic functional group. Typical carboxylate groups include carboxylic acids, carboxylic esters, carboxylic anhydrides, and the like, and mixtures thereof.

The anionic functional group can include any functional group that possesses a negative charge at a certain pH. Representative anionic functional groups include carboxylate, sulfonate, sulfate, phosphonate, phosphate, phosphite and the like, or an organic aliphatic or aromatic moiety substituted by at least one of the foregoing.

In an embodiment, the anionic diacid monomer and can include, for example, dimethyl 5-sulfoisophthalate, sulfosuccinic acid, 4-sulfophthalic acid, sulfonaphthalic acid, the like, salts thereof, anhydrides thereof and combinations thereof.

In an embodiment, the polyester composition of the present invention has the following formula:

$(A)_x(B)_y$ where A is the anionic diacid monomer, B is the polyether, and x and y are independently integers of 1 to about 250. Preferably, the anionic diacid monomer or diester monomer thereof has the following formula:

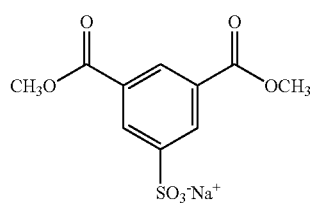

In an embodiment, the $(B)_y$ component can include one or any combination of polyethers as represented by the following formulas:

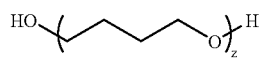

where z ranges from 1 to about 100, preferably from 2 to about 40;

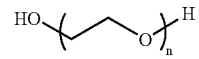

where n ranges from 1 to about 150, preferably from about 6 to about 35;

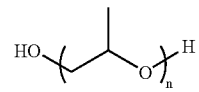

where n ranges from 1 to about 150, preferably from about 5 to about 40;

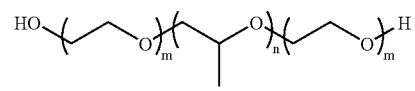

where m ranges from 1 to about 150, preferably from 2 to about 50, and where n ranges from 1 to about 150, preferably from 2 to about 50;

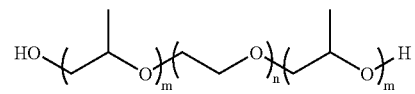

where m ranges from 1 to about 150, preferably from 2 to about 50, and where n ranges from 1 to about 150, preferably from 2 to about 50;

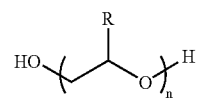

where R is an alkyl, —H, —CH$_3$ or the like, and where n ranges from 1 to about 150, preferably about 5 to about 40;

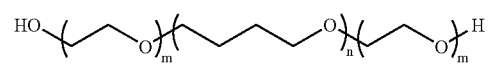

where m ranges from 1 to about 150, preferably from 2 to about 50, and where n ranges from 1 to about 150, preferably from 2 to about 33; and

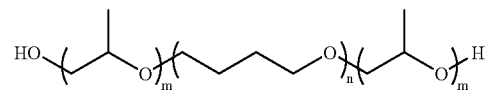

where m ranges from 1 to about 150, preferably from 2 to about 50, and where n ranges from 1 to about 150, preferably from 2 to about 33.

In a preferred embodiment, the polyester composition has the following formula:

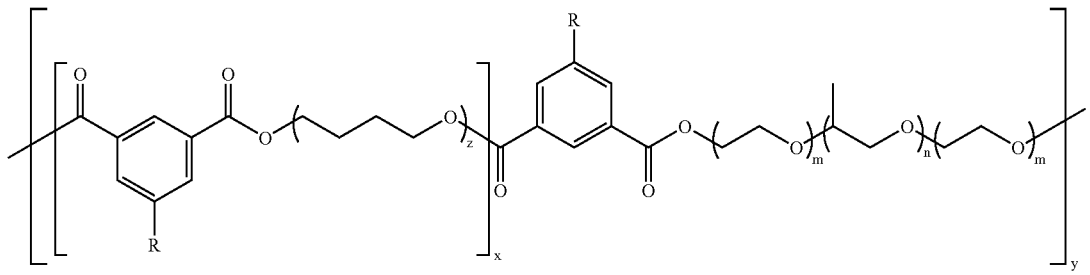

where R is an anionic functional group; m ranges from 1 to about 150, preferably 2 to about 50; n ranges from 1 to about 150, preferably 2 to about 50; x any y independently range from 0 to about 250, provided that x and y are not both 0; and z ranges from 1 to about 100, preferably 2 to about 40.

In another preferred embodiment, R is selected from carboxylate, sulfonate, sulfate, phosphonate, phosphate, phosphite and an organic aliphatic or aromatic moiety substituted by at least one from carboxylate, sulfonate, sulfate, phosphonate, phosphate, or phosphite group.

In another preferred embodiment, R is sulfonate.

The polyester compositions can be characterized in a number of suitable and different ways. In an embodiment, the number average molecular weight ranges from about 500 to about 20,000, preferably from about 500 to about 8,000, such as from about 574 to about 6300.

The polyester compositions of the present invention can be made in a variety of suitable ways. In general, the polymeric compositions are made by processing a number of different ingredients or reactants at least including a polyether and an anionic diacid monomer or diester monomer thereof. The reactants can be processed in any suitable reaction and under any suitable process conditions with respect to, for example, temperature, pressure and/or the like.

As previously discussed, the polyester compositions of the present invention can be effectively utilized in a number of different applications, particularly as applied during crude oil production and refinery processing. In general, the polyester composition can be added to the crude oil or other treatable fluid in any suitable effective amount and in any suitable manner.

In an embodiment, the polyester composition is provided in a suitable carrier such as water, aliphatic solvents such as kerosene and aromatic solvents such as heavy aromatic naphtha at any suitable concentration. A preferred carrier solvent is water. In an embodiment, the concentration of the polyester composition in the carrier solvent ranges from about 1% by weight to about 60% by weight, preferably from about 30% by weight to about 50% by weight.

The polyester composition can be added to the crude oil or the like in any suitable manner as previously discussed. Preferably, the polyester composition is dissolved in a carrier solvent as discussed above and subsequently added to the crude. In an embodiment, the polyester composition in liquid form can be diluted with an appropriate solvent, preferably water, in any suitable volume ratio prior to adding the polyester composition to the crude. In an embodiment, the volume ratio of dilution solvent (i.e., water) to polyester composition in liquid form is at least about 5 to about 1.

It should be appreciated that the polyester composition of the present invention can be adapted in any suitable way for treatment purposes. For example, the polyester composition may be dissolved in a carrier solvent and then added directly to the crude or the like without further dilution. Also, the polyester composition may be added to the crude or the like in dry form.

The polyester composition may be used alone or in combination with any of a number of additional demulsifiers known in the art including alcohols, fatty acids, fatty amines, glycols and alkylphenol formaldehyde condensation products. The polyester composition may also be used in combination with corrosion inhibitors, viscosity reducers and other chemical treatments used in crude oil production, refining and chemical processing.

By way of example and not limitation, the following examples illustrate how the polyester compositions according to an embodiment of the present invention can be made:

EXAMPLE ONE 4.30 grams ("g") of poly(tetrahydrofuran) was charged into a suitable reactor and maintained at greater than 70° C. The number average molecular weight of the poly(tetrahydrofuran) was about 1400. Next, 4.54 g of poly(ethylene glycol)-block-poly(propylene glycol)-block-poly(ethylene glycol) was charged into the reactor. The block copolymer had a molecular weight of about 2900 at about 40% by weight of ethylene oxide ("EO"). Next, 1.16 g of dimethyl 5-sulfoisophthalate was charged into the reactor. Then, 0.008 g of sodium acetate was charged into the reactor. 0.015 g of titanium butoxide was then charged into the reactor while stirring vigorously. The reactor was purged with nitrogen gas under heat at about 200° C. The temperature was maintained at about 200° C. for about 5 hours. The resultant polyester product was cooled and transferred from the reactor.

EXAMPLE TWO 4.28 g of poly(tetrahydrofuran) at a molecular weight of approximately 1,000 was charged into a reactor at a temperature greater than 70° C. 4.12 g of poly(ethylene glycol)-block-poly(propylene glycol)-block-poly(ethylene glycol) at a molecular weight approximately equal to 1900 and 50% EO was charged into the reactor. Next, 1.60 g dimethyl 5-sulfoisophthalate was charged into the reactor which was subsequently followed by a charge of 0.008 g sodium acetate. The reactor was then charged with 0.015 g titanium butoxide while stirring vigorously. Next, the reactor was purged with nitrogen gas and heated to about 200° C. The reactor was maintained at this temperature for about 5 hours. The resultant polyester product was cooled and transferred from the reactor.

EXAMPLE THREE 5.10 g of poly(tetrahydrofuran) at a molecular weight approximately equal to 1400 was charged into the reactor wherein the temperature was maintained at greater than 70° C. Next, 5.35 g of poly(ethylene glycol)-block-poly(propylene glycol)-block-poly(ethylene glycol) at a molecular weight of approximately 1900 at 50% EO was charged into the reactor. The reactor was then charged with 1.38 g dimethyl 5-sulfoisophthalate and subsequently charged with 0.008 g sodium acetate. Next, 0.015 g of titanium butoxide was charge into the reactor while stirring vigorously. The reactor was purged with nitrogen gas and heated to about 200° C. The temperature was maintained at about 200° C. for about 5 hours. The resultant product was cooled and transferred from the reactor.

EXAMPLE FOUR 148.32 g of poly(tetrahydrofuran) at a molecular weight of approximately 2000 was charged into the reactor and maintained at a temperature greater than 70° C. 68.04 g poly(ethylene glycol)-block-poly(propylene glycol)-block-poly(ethylene glycol) at an approximate molecular weight of 1900 and at 50% EO was then charged into the reactor. The reactor was next charged with 26.52 g dimethyl 5-sulfoisophthalate. Then, 0.18 g sodium acetate was charged into the reactor. A charge of 0.36 g titanium butoxide was added into the reactor while stirring vigorously. The reactor was purged with nitrogen gas and heated to about 200° C. This temperature was maintained at about 200° C. for about 5 hours. The resultant product was cooled and transferred.

EXAMPLE FIVE

A charge of 6.88 g poly(tetrahydrofuran) at a molecular weight approximately equal to 2900 was added to a reactor and maintained at a temperature greater than 70° C. Then, 2.24 g poly(ethylene glycol)-block-poly(propylene glycol)-block-poly(ethylene glycol) at a molecular weight approximately equal to 1900 and at 50% EO was charged into the reactor. A charge of 0.87 g dimethyl 5-sulfoisophthalate was next added to the reactor. 0.008 g of sodium acetate was charged into the reactor, subsequently followed by a charge of 0.015 g titanium butoxide while stirring vigorously. The reactor was purged with nitrogen gas and heated to about 200° C. This temperature was maintained at about 200° C. for about 5 hours. The resultant product was cooled and transferred from the reactor.

EXAMPLE SIX 5.17 g of poly(tetrahydrofuran) at a molecular weight approximately equal to 1000 was charged into the reactor and maintained at a temperature greater than 70° C. A charge of 2.88 g poly(ethylene glycol)-block-poly(propylene glycol)-block-poly(ethylene glycol) at a molecular weight approximately equal to 1100 and at 10% EO was added to the reactor. Next, 1.94 g dimethyl 5-sulfoisophthalate was charged into the reactor, subsequently followed by a charge of 0.008 g sodium acetate. Then, 0.015 g titanium butoxide was charged into the reactor while stirring vigorously. The reactor was purged with nitrogen gas and heated to about 200° C. The temperature was maintained at about 200° C. for about 5 hours. The resultant product was cooled and transferred from the reactor.

Tests were conducted on the polyester compositions made in accordance with an embodiment of the present invention. In particular, a Bottle Test, a PED Test and a Viscosity Reduction Test were conducted to demonstrate the beneficial effects of the present invention as described below in greater detail.

Bottle Test

Samples of a crude oil emulsion (100 mL; API gravity=18) were placed in graduated prescription bottles and heated to 180° F. in a water bath. The heated samples were treated with 500 ppm by weight of the polyester composition made pursuant to each of Example 1–6 as discussed above. The treated crude samples were then shaken for 10 minutes to mix the additive (i.e., polyester composition) into the crude oil. The samples were then returned to the water bath at 180° F. After 15 minutes, the samples were removed from the water bath. Any free water that has separated from the crude emulsion was then recorded. The sample was then returned to the hot water bath. Free water readings were repeatedly taken at 30, 45, 60, 90 and 120 minutes.

After 120 minutes, a 5 mL sample of the crude oil was taken from a point approximately 15 mL above the level of the free water. The crude sample was diluted with 5 mL hydrocarbon solvent in a graduated centrifuge tube and shaken vigorously. The diluted sample was placed in a centrifuge at high speed for 10 minutes. The centrifuged sample was removed and free water (W) and residual emulsion (BS) levels were then recorded. Next, the samples were then treated with a slugging compound to coalesce all of the remaining water in the sample. The treated samples were shaken vigorously and centrifuged. The centrifuged sample was removed and the total free water (Slug) was recorded. The results of the Bottle Test are indicated below in Table I.

TABLE I

| | Water Drop (minutes) | | | | | | Thief Grindout | | |
|---|---|---|---|---|---|---|---|---|---|
| Product | 15 | 30 | 45 | 60 | 90 | 120 | B.S. | W | Slug |
| Comparative Sample | 15 | 22 | 23 | 24 | 25 | 26 | 1.2 | 0.8 | 2.4 |
| Sample 1 | 13 | 24 | 25 | 26 | 26 | 27 | 4.2 | 0.6 | 5.0 |
| Sample 2 | 3 | 18 | 23 | 25 | 27 | 27 | Trace | 3.6 | 4.0 |
| Sample 3 | 3 | 22 | 24 | 26 | 27 | 27 | 2.4 | 0.0 | 2.4 |
| Sample 4 | 6 | 23 | 24 | 25 | 26 | 27 | 3.0 | 0.4 | 3.4 |
| Sample 5 | 6 | 24 | 26 | 27 | 27 | 28 | 2.8 | 0.4 | 3.2 |
| Sample 6 | 3 | 10 | 20 | 23 | 25 | 27 | 3.6 | 0.8 | 4.2 |
| Blank | — | — | 1 | 1 | 1 | 1 | | | |

As shown in Table I, the polyester composition made pursuant to an embodiment of the present invention displayed effective demulsifier properties based on the Bottle Test. In this regard, crude oil Samples 1–6 were treated with a polyester composition made pursuant to Examples 1–6, respectively. The Bottle Test was also conducted on a blank sample and a comparative crude oil sample that was treated with a commercially available demulsifier.

PED Test

The PED ("Portable Electric Desalter") test is a static test to compare the relative efficiencies of emulsion breaker formulations. A water-in-oil emulsion was prepared under controlled conditions in a blender. The emulsion was poured into glass tubes. The tubes were placed into the PED unit where the emulsion was resolved with the assistance of heat and electric field. The resolution of the emulsion was noted by the volume of water resolved during the period of time of testing. The volume of water and the speed at which it separated were used for comparison of the efficiency of the 5 test formulations which included Products A–D each treated with 6 ppm of a commercially available chemical and Sample 4 treated with 6 ppm of polyester composition made pursuant to Example 4 discussed above. Two power levels were used during the testing, based on the API gravity of the crude (38.5° API at 72° F.). The blending time was ten seconds during the studies conducted. After about 7 to 8 minutes of heating, a voltage of 3000 volts was applied for one minute. In the testing, an additional voltage of 500 volts was applied in about 17 to about 18 minute time interval. The time period for the testing was 30 minutes. The temperature of the testing was maintained at about 205° F. The maximum water separation is 3.75 milliliters for a 5% wash water concentration at pH 5.5. The test results are indicated below in Table II.

TABLE II

| | WATER SEPARATION IN MILLILITERS AT TIME INDICATED: | | | | |
|---|---|---|---|---|---|
| PRODUCT | 5 MIN. | 10 MIN. | 15 MIN. | 20 MIN. | 30 MIN. |
| BLANK | 1.00 | 2.40 | 2.40 | 2.50 | 2.70 |
| Product A | 2.10 | 2.80 | 2.80 | 2.80 | 2.90 |
| Product B | 2.50 | 3.00 | 3.00 | 3.00 | 3.10 |
| Product C | 3.00 | 3.60 | 3.70 | 3.75 | 3.75 |
| Product D | 2.20 | 3.30 | 3.30 | 3.50 | 3.10 |
| Sample 4 | 2.10 | 3.00 | 3.00 | 3.00 | 3.00 |

Viscosity Reduction Test

Samples of a crude oil emulsion were heated in a water bath at 180° F. Each crude sample (Samples 1–5 and Comparative Sample) were treated with 300 ppm by weight of an additive. Samples 1–5 were treated with the polyester compositions made pursuant to Examples 1–5, respectively, as discussed above. The comparative sample was treated with a commercially-available chemical. A blank run was also conducted. The viscosity reducing additive was thoroughly mixed with the crude. The treated crude was placed in a thermostatic viscometer at 180° F. Viscosity data was collected over time as shown below in Table III.

TABLE III

| | | Viscosity (Centipoise) | | | | |
|---|---|---|---|---|---|---|
| Time (Minutes) | Blank | Incumbent Chemical | Sample 1 | Sample 2 | Sample 3 | Sample 4 | Sample 5 |
| 5 | 5039 | 3575 | 3239 | 3911 | 3623 | 3167 | 3719 |
| 30 | 4775 | 2136 | 1680 | 2471 | 2328 | 1896 | 2280 |
| 60 | 4223 | 1584 | 1464 | 1992 | 1752 | 1488 | 1680 |
| 90 | 4175 | 1104 | 1080 | 1368 | 1272 | 1008 | 1320 |
| 120 | 4079 | 984 | 984 | 1008 | 1008 | 864 | 1056 |
| 150 | 4175 | 936 | 816 | 888 | 840 | 768 | 960 |
| 180 | 4199 | 960 | 744 | 888 | 816 | 720 | 936 |
| 210 | 4271 | 960 | 744 | 888 | 744 | 672 | 816 |

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A polyester compound prepared by reacting reactants consisting of anionic diacid monomer selected from the group consisting of dimethyl 5-sulfoisophthalate, sulfosuccinic acid, 4-sulfophthalic acid, sulfonaphthalic acid, salts thereof and anhydrides thereof and combinations thereof; with polytetrahydrofuran and poly(ethylene glycol)-block-poly(propylene glycol)-block-poly(ethylene glycol).

2. The polyester compound of claim 1 wherein the anionic diacid monomer is dimethyl 5-sulfoisophthalate, sodium salt.

3. The polyester compound of claim 1 wherein the poly(ethylene glycol)-block-poly(propylene glycol)-block-poly(ethylene glycol) has formula

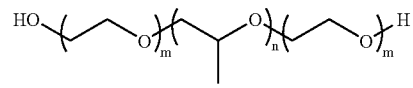

where m ranges from 1 to about 150; and n ranges from 1 to about 150.

4. The polyester compound of claim 3 wherein m ranges from 2 to about 50; and where n ranges from 2 to about 50.

5. The polyester compound of claim 1 having a number average molecular weight that ranges from about 500 lo about 20,000.

6. An oil-treatment agent comprising a polyester compound according to claim 1 and a carrier solvent.

7. An oil-treatment agent comprising a polyester compound according to claim 1 and a crude oil production or processing demulsifier.

8. An oil-treatment agent comprising a polyester compound according to claim 1 and a crude oil production or processing viscosity reducer.

9. An oil-treatment agent comprising a polyester compound according to claim 1 and a crude oil production or processing emulsion modifier.

10. A method of treating oil, the method comprising providing a polyester compound according to claim 1; and adding an effective amount of the polyester compound to the oil for demulsification, viscosity reduction, or emulsion modification.

11. The method of claim 10 wherein the polyester compound is capable of demulsifying crude oil during production or processing thereof.

12. The method of claim 10 wherein the polyester compound is capable of reducing oil viscosity crude oil during production or processing thereof.

13. The method of claim 10 wherein the polyester compound is capable of modifying emulsions in crude oil during production or processing thereof.

14. The method of claim 10 wherein the polyester compound is added to the oil in liquid form.

15. The method of claim 10 wherein the liquid form is prepared by dissolving the polyester compound in an aqueous carrier medium.

16. The method of claim 15 wherein the concentration of the polyester compound in the liquid form ranges from about 1% by weight to about 60% by weight.

17. The method of claim 16 wherein the treatment agent is diluted prior to addition to the oil.

* * * * *